US011772652B2

(12) United States Patent
Kim et al.

(10) Patent No.: US 11,772,652 B2
(45) Date of Patent: *Oct. 3, 2023

(54) COOPERATIVE ADAPTIVE CRUISE CONTROL SYSTEM BASED ON DRIVING PATTERN OF TARGET VEHICLE

(71) Applicants: Hyundai Motor Company, Seoul (KR); Kia Corporation, Seoul (KR)

(72) Inventors: Yoon Soo Kim, Gyeonggi-do (KR); Dong Gyu Noh, Gyeonggi-do (KR); In Yong Jung, Gyeonggi-do (KR); Su Lyun Sung, Gyeonggi-do (KR); Seung Wook Park, Gyeonggi-do (KR); Jong Rok Park, Seoul (KR); Cho Rong Ryu, Incheon (KR); Jun Sik Hwang, Gyeonggi-do (KR); Min Byeong Lee, Gyeonggi-do (KR); Hahk Rel Noh, Gyeonggi-do (KR); Dae Sung Hwang, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/891,199

(22) Filed: Aug. 19, 2022

(65) Prior Publication Data

US 2022/0396267 A1 Dec. 15, 2022

Related U.S. Application Data

(63) Continuation of application No. 15/833,922, filed on Dec. 6, 2017, now Pat. No. 11,458,970, which is a (Continued)

(30) Foreign Application Priority Data

Jun. 29, 2015 (KR) .................... 10-2015-0092204
Dec. 30, 2016 (KR) .................... 10-2016-0184289

(51) Int. Cl.
*B60W 30/165* (2020.01)
*B60W 10/04* (2006.01)
(Continued)

(52) U.S. Cl.
CPC .......... *B60W 30/165* (2013.01); *B60W 10/04* (2013.01); *B60W 10/06* (2013.01);
(Continued)

(58) Field of Classification Search
None
See application file for complete search history.

(56) References Cited

U.S. PATENT DOCUMENTS 11,066,070 B2 7/2021 Kim et al.
2012/0065876 A1 3/2012 Kadowaki et al.
(Continued)

FOREIGN PATENT DOCUMENTS

CN 103754221 A 4/2014
DE 10 2008 061 303 A1 6/2009
(Continued)

OTHER PUBLICATIONS

Obst et al., "Multi=Sensor Data Fusion for Checking Plausibility of V2V Communications by Vision-Based Multiple-Object Tracking", IEEE Vehicular Networking Conference (VNC), Dec. 3, 2014, 143-150.
(Continued)

*Primary Examiner* — Peter D Nolan
*Assistant Examiner* — Michael F Whalen
(74) *Attorney, Agent, or Firm* — Fox Rothschild LLP

(57) ABSTRACT

A cooperative adaptive cruise control (CACC) system acquires a driving pattern of a target vehicle and variably provides an inter-vehicle distance and a responsible speed level of a subject vehicle that are followed by the CACC system based on the driving pattern. The CACC system
(Continued)

includes a communication unit receiving vehicle information and road information of a region in which the subject vehicle travels; an information collection unit collecting driving information of a forward vehicle, vehicle information of the subject vehicle, and the road information; and a control unit controlling the inter-vehicle distance and the responsible speed level of the CACC system based on the driving pattern of the target vehicle according to generated control information.

12 Claims, 7 Drawing Sheets

Related U.S. Application Data continuation-in-part of application No. 14/960,347, filed on Dec. 5, 2015, now abandoned.

(51) Int. Cl.
  *B60W 10/18* (2012.01)
  *B60W 50/14* (2020.01)
  *B60W 30/16* (2020.01)
  *B60W 10/06* (2006.01)

(52) U.S. Cl.
  CPC ............ *B60W 10/18* (2013.01); *B60W 30/16* (2013.01); *B60W 50/14* (2013.01); *B60W 2050/146* (2013.01); *B60W 2420/42* (2013.01); *B60W 2420/52* (2013.01); *B60W 2552/00* (2020.02); *B60W 2554/00* (2020.02); *B60W 2554/80* (2020.02); *B60W 2554/804* (2020.02); *B60W 2555/20* (2020.02); *B60W 2556/45* (2020.02); *B60W 2556/65* (2020.02); *B60W 2710/0605* (2013.01); *B60W 2710/18* (2013.01); *B60W 2720/10* (2013.01); *B60W 2754/10* (2020.02); *B60W 2756/10* (2020.02)

(56) References Cited

U.S. PATENT DOCUMENTS

| | | |
|---|---|---|
| 2012/0095671 A1 | 4/2012 | Matsumura et al. |
| 2012/0306634 A1 | 12/2012 | Tsuda et al. |
| 2013/0116909 A1 | 5/2013 | Shida |
| 2014/0005906 A1 | 1/2014 | Pandita et al. |
| 2014/0070980 A1 | 3/2014 | Park |
| 2014/0107890 A1 | 4/2014 | Funabashi |
| 2014/0292545 A1 | 10/2014 | Nemoto |
| 2014/0324312 A1 | 10/2014 | Okuya et al. |
| 2015/0077270 A1 | 3/2015 | Rubin et al. |
| 2015/0178247 A1 | 6/2015 | Kinoshita et al. |
| 2015/0206431 A1 | 7/2015 | Park et al. |
| 2015/0294571 A1 | 10/2015 | Shida et al. |
| 2016/0200319 A1 | 7/2016 | Nemoto |
| 2016/0210795 A1 | 7/2016 | Shin et al. |
| 2016/0214480 A1 | 7/2016 | Solyom et al. |
| 2016/0297436 A1 | 10/2016 | Shin et al. |
| 2016/0332624 A1 | 11/2016 | Tezuka |
| 2016/0375905 A1 | 12/2016 | Park et al. |
| 2017/0053534 A1 * | 2/2017 | Lokesh ............... B60W 30/165 |
| 2017/0154531 A1 | 6/2017 | Funabashi |
| 2017/0197549 A1 | 7/2017 | Vladimerou et al. |
| 2017/0355368 A1 | 12/2017 | O'Dea et al. |
| 2018/0001892 A1 | 1/2018 | Kim et al. |
| 2018/0093666 A1 | 4/2018 | Kim et al. |
| 2020/0094827 A1 | 3/2020 | Park |
| 2020/0108831 A1 | 4/2020 | Park |
| 2020/0282990 A1 | 9/2020 | Sato |
| 2020/0290638 A1 | 9/2020 | Damnjanovic et al. |
| 2021/0241628 A1 | 8/2021 | Otaka et al. |
| 2021/0316726 A1 | 10/2021 | Kim et al. |

FOREIGN PATENT DOCUMENTS

| | | | |
|---|---|---|---|
| DE | 102012011994 A1 * | 12/2013 | ............ B60W 30/09 |
| DE | 102014000843 A1 * | 8/2014 | ............ B60W 30/08 |
| JP | H06-191319 A | 7/1994 | |
| JP | H06-255393 A | 9/1994 | |
| JP | H09-324666 A | 12/1997 | |
| JP | 2000-335276 A | 12/2000 | |
| JP | 2009-262755 A | 11/2009 | |
| JP | 2013-228804 A | 11/2013 | |
| JP | 2014-024486 A | 2/2014 | |
| KR | 10-2006-0053649 A | 5/2006 | |
| KR | 10-1380888 B1 | 4/2014 | |
| KR | 10-2014-0062973 A | 5/2014 | |
| KR | 10-2015-0056000 A | 5/2015 | |

OTHER PUBLICATIONS

European Search Report for European Patent Application No. 17205444, dated Sep. 14, 2018, 9 pages.

* cited by examiner

FIG. 6

| Responsibility | Normal | Fast | Normal | Normal |
|---|---|---|---|---|
| Inter-vehicle distance | | | | |
| Road traffic information | Expressway | Expressway | Expressway | Expressway |
| | Free | Free | Slow | Delay |
| | Clear | Rainy | Clear | Clear |
| Target vehicle speed | Low | High | Low | Low |
| Responsibility | Normal | Fast | Slow | Normal |
| Inter-vehicle distance | | | | |
| Road traffic information | General road | General road | General road | General road |
| | Free | Free | Delay | Delay |
| | Clear | Rainy | Clear | Rainy |
| Target vehicle speed | High | High | Low | Low |

COOPERATIVE ADAPTIVE CRUISE CONTROL SYSTEM BASED ON DRIVING PATTERN OF TARGET VEHICLE

CROSS-REFERENCE TO RELATED APPLICATIONS

This application is a Continuation application of U.S. Ser. No. 15/833,922, filed Dec. 6, 2017, which is a continuation-in-part (CIP) of U.S. patent application Ser. No. 14/960,347, filed on Dec. 5, 2015, and claims under 35 U.S.C. § 119(a) the benefit of Korean Patent Application Nos. 10-2015-0092204 and 10-2016-0184289 filed on Jun. 29, 2015 and Dec. 30, 2016, respectively, the entire contents of which are incorporated herein by reference.

BACKGROUND

(a) Technical Field

Exemplary embodiments of the present disclosure relate to a cooperative adaptive cruise control (hereinafter referred to as "CACC") system, and more particularly, to a CACC system which acquires a driving pattern of a target vehicle and variably provides an inter-vehicle distance and a responsible speed level that are followed by the CACC system based on the driving pattern.

(b) Description of the Related Art

An adaptive cruise control (hereinafter referred to as "ACC") system is a system which operates to perform automated driving at a speed that is equal to or lower than that set by a driver and to constantly maintain an inter-vehicle distance from a target vehicle. The ACC system provides a cruise function that performs automated driving at the speed set by the driver while maintaining a constant distance from the target vehicle through sensing the front side with a radar sensor mounted on the vehicle, or a speed limit function that controls the speed of the vehicle not to exceed the speed set by the driver.

The ACC system can enable the driver not to continuously operate an accelerator pedal in order to adjust the driving speed of the vehicle to provide convenience to the driver, and can achieve safety driving through prevention of the vehicle from driving over the set speed.

On the other hand, a CACC system is a system that can improve the ACC function through addition of V2X (Vehicle to Everything) communications to the above-described ACC system. The CACC system may receive the speed limit of a road through V2I (Vehicle to Infrastructure), receive information on a target vehicle that travels in the same lane through V2V (Vehicle to Vehicle), and then improve the ACC performance based on received information.

The CACC system can set an inter-vehicle distance, a time gap, and a responsible speed level as generally used parameters. However, it causes inconvenience to change setting of such parameters every time according to the road state or movement of the target vehicle.

In order to avoid such inconvenience, there has been a need for automatic setting of the parameters according to the road state or the movement of the target vehicle.

SUMMARY

An object of the present disclosure is to generate CACC system control information through acquisition of a driving pattern of a target vehicle, road information and/or weather information, and the speed of the target vehicle, and to variably provide an inter-vehicle distance and a responsible speed level of the CACC system.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a cooperative adaptive cruise control (hereinafter referred to as "CACC") system that is provided in a subject vehicle to control a driving speed of the subject vehicle includes a communication unit configured to receive vehicle information including positions of neighboring vehicles and driving information and road information of a region in which the subject vehicle travels using V2V (Vehicle to Vehicle) and V2I (Vehicle to Infrastructure) communications; an information collection unit configured to collect driving information of a forward vehicle, vehicle information of the subject vehicle, and the road information of the region in which the subject vehicle travels using sensors provided on the subject vehicle; and a control unit configured to select a target vehicle to be followed by the subject vehicle based on the vehicle information of the neighboring vehicles that is acquired by the communication unit and the driving information of the forward vehicle that is collected by the information collection unit, to generate a plural pieces of case information using the road information collected by the communication unit and the information collection unit, to generate control information for the generated plural cases using driving information of the target vehicle and the vehicle information of the subject vehicle, and to control an inter-vehicle distance and a responsible speed level of the CACC system based on a driving pattern of the target vehicle according to the generated control information.

The CACC system according to the aspect of the present disclosure may further include a driving unit configured to control a throttle and a brake, wherein the control unit controls the driving unit to control the driving speed of the subject vehicle. Further, the CACC system according to the aspect of the present disclosure may further include a driver vehicle interface (DVI) unit configured to receive an input of a target speed and/or a target time gap from a driver and to notify the driver of state information of the CACC system and a driving pattern of the target vehicle.

The information collection unit may include a navigation configured to collect the road information of the region in which the subject vehicle currently travels; a front information acquisition unit configured to collect information of the forward vehicle that travels in front of the subject vehicle; and an information unit configured to collect information of the traveling subject vehicle. The information collection unit may further include a time sensor, an illumination sensor, and a rain sensor configured to collect information on time and weather of the region in which the subject vehicle currently travels.

The control unit may include a state management unit configured to manage a state of the CACC system; a target vehicle selection unit configured to select the target vehicle to be followed by the subject vehicle based on the vehicle information of the neighboring vehicles that is acquired from the communication unit and the driving information of the forward vehicle that is collected by the information collection unit; an analysis module configured to generate the plural pieces of case information using the road information collected by the communication unit and the information collection unit, to generate the control information for the generated plural cases using the driving information of the target vehicle and the vehicle information of the subject vehicle, to determine the driving pattern of the target vehicle according to the generated control information, and to determine the inter-vehicle distance based on the determined driving pattern; a determination unit configured to determine the responsible speed level of the CACC system based on the determined driving pattern that is transferred from the analysis module; and a driving management unit configured to control the driving speed of the subject vehicle according to the determined inter-vehicle distance and a responsible speed level.

The state management unit may display the state of the CACC system as one of an off state in which the CACC system does not operate, a standby state in which the CACC system operates, but does not control the driving speed of the subject vehicle, an ACC activation state in which the driving speed of the subject vehicle is controlled using only the information that is acquired from the subject vehicle in a state where there is no vehicle in a region of interest that is connected through the V2V communications, and a cooperative activation state in which there is the neighboring vehicle in the region of interest that is connected through the V2V communications, and the driving speed of the subject vehicle is controlled using the information from the neighboring vehicle that is acquired through the V2V communications and the information that is acquired from the subject vehicle.

The analysis module may generate control information of the subject vehicle for maintaining a set distance from the target vehicle based on driving pattern data of the target vehicle. Further, the analysis module may match control information of the subject vehicle with the road information of the region in which the subject vehicle currently travels.

In accordance with another aspect of the present disclosure, a method for setting an inter-vehicle distance and a responsible speed level of a subject vehicle in a cooperative adaptive cruise control (hereinafter referred to as "CACC") system that is provided in the subject vehicle to control a driving speed of the subject vehicle includes collecting road information that includes a road class and traffic information of a region in which the subject vehicle currently travels; collecting relative speed information and distance information of a target vehicle that travels in front of the subject vehicle; collecting speed information and vehicle state information of the subject vehicle; generating driving pattern data of the target vehicle based on the road class and the traffic information; and setting the inter-vehicle distance and the responsible speed level of the CACC system based on the driving pattern of the target vehicle according to control information of the subject vehicle.

The generating the driving pattern data of the target vehicle may further include generating the control information of the subject vehicle for maintaining a set distance from the target vehicle based on the driving pattern data of the target vehicle.

The generating the control information of the subject vehicle may further include matching the control information of the traveling vehicle with road information of a region in which the vehicle currently travels.

Controlling the responsible speed level may further include displaying a driving pattern of a forward vehicle according to the road information.

According to the CACC system according to the present disclosure, since a driver's setting menu can be simplified, driver's use convenience can be improved, and automatic driving safety of the CACC system can be sought.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 6 is a reference diagram as to how a determination unit controls a responsible speed level.

DETAILED DESCRIPTION

Figure 1:
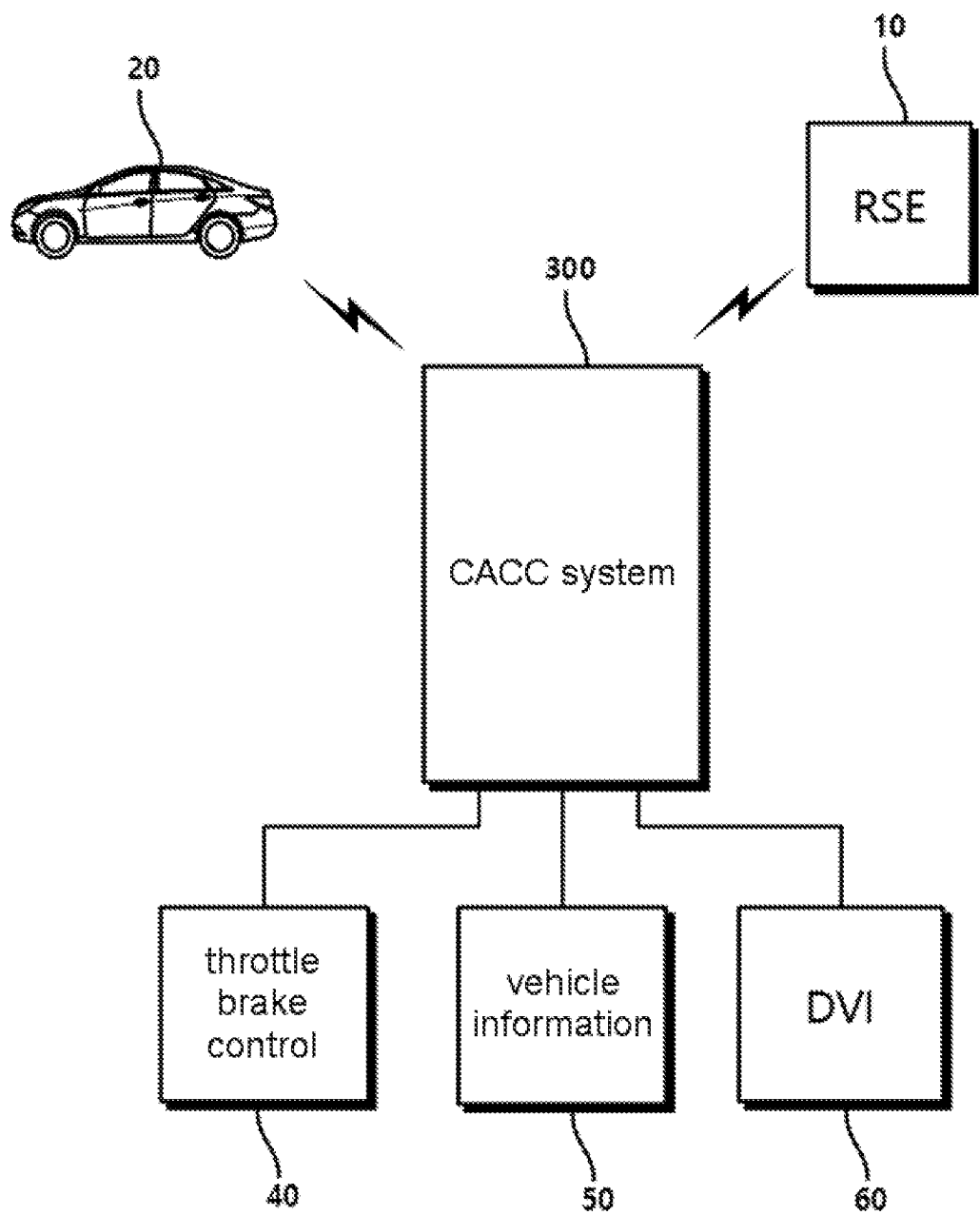
FIG. 1 is an exemplary diagram of a CACC system to which the present disclosure is applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specially defined, all terms (including technical and scientific terms) used in the description could be used as meanings commonly understood by those ordinary skilled in the art to which the present disclosure belongs. In addition, terms that are generally used but are not defined in the dictionary are not interpreted ideally or excessively unless they have been clearly and specially defined.

Hereinafter, preferred embodiments of the present disclosure will be described in detail with reference to the accompanying drawings. The matters defined in the description, such as the detailed construction and elements, are nothing but specific details provided to assist those of ordinary skill in the art in a comprehensive understanding of the disclosure. However, the present disclosure is not limited to the embodiments disclosed hereinafter, but can be implemented in diverse forms.

First, definitions that may be applicable to the specification as provided herein will be defined.

Forward vehicle: Vehicle that is in front of a subject vehicle and moves in the same direction along the same road of the subject vehicle.

Clearance: Distance between an end portion of a forward vehicle and a front portion of a subject vehicle.

Region of interest: Region in which a potential vehicle of interest to be described later and a target vehicle exist, and which may exert an influence on the control of a CACC system that is provided in a subject vehicle.

Potential vehicle of interest: Vehicle which exists in a region of interest and performs V2V communications with a subject vehicle.

Target vehicle: Vehicle which is followed by a subject vehicle and which may be connected or may not be connected to a subject vehicle through V2V communications.

Time gap: Value that is calculated by the speed of a subject vehicle and a gap between a subject vehicle and a forward vehicle (time gap=gap/speed).

Hereinafter, preferred embodiments of the present disclosure will be described in detail with reference to the accompanying drawings.

FIG. 1 is an exemplary diagram of a CACC system to which the present disclosure is applied.

As illustrated in FIG. 1, a CACC system 300 that is applied to the present disclosure is a system to which wireless communication with front vehicles and/or infrastructure preferably is added in order to strengthen the sensing capability of an ACC system in the related art. The CACC system 300 may receive a road speed limit, a time gap (time difference between a subject vehicle and a front vehicle), and/or other standard messages from road-side equipment (RSE) using V2I communications. That is, the CACC system 300 of the vehicle may receive an input of information, such as a recommended set speed or a time gap, from the regional traffic control system through the V2I communications. Further, the CACC system may receive neighboring vehicle information that includes driving information (speed and acceleration) of a neighboring vehicle 20 through V2V communications with at least one neighboring vehicle 20, or may transfer its own vehicle information to the neighboring vehicle 20. In addition, the CACC system may acquire vehicle information of a vehicle that may be in front of the subject vehicle using sensors in the related art.

In this case, the traveling vehicle information may include vehicle identification (ID) for discriminating from other vehicles, vehicle shape, size, brake performance, vehicle financial resource information including total vehicle weight, vehicle position information indicated by 3D coordinates of latitude, longitude, and altitude, vehicle progressive angle measured on the basis of due north direction, vehicle speed, acceleration, yaw rate, brake state, throttle position, and steering angle.

Further, the CACC system may receive an input of a set speed or a time gap from a driver through a driver vehicle interface (DVI) 60, and may notify the driver of state information of the CACC system. Further, the CACC system may acquire vehicle information 50 from various kinds of sensors or control devices provided inside the vehicle. The CACC system may control the speed of the vehicle through control of the throttle or brake based on various kinds of data collected through the above-described method.

As described above, through the information acquisition by the V2V communications and/or V2I communications, the CACC system can control the time gap with the front vehicle more accurately while maintaining smooth driving comport, and can respond to the speed changes by a plurality of front vehicles quite rapidly. Further, the CACC system has the advantage that it can set a shorter time gap without weakening safety or a driver's sense of stability.

Figure 2:
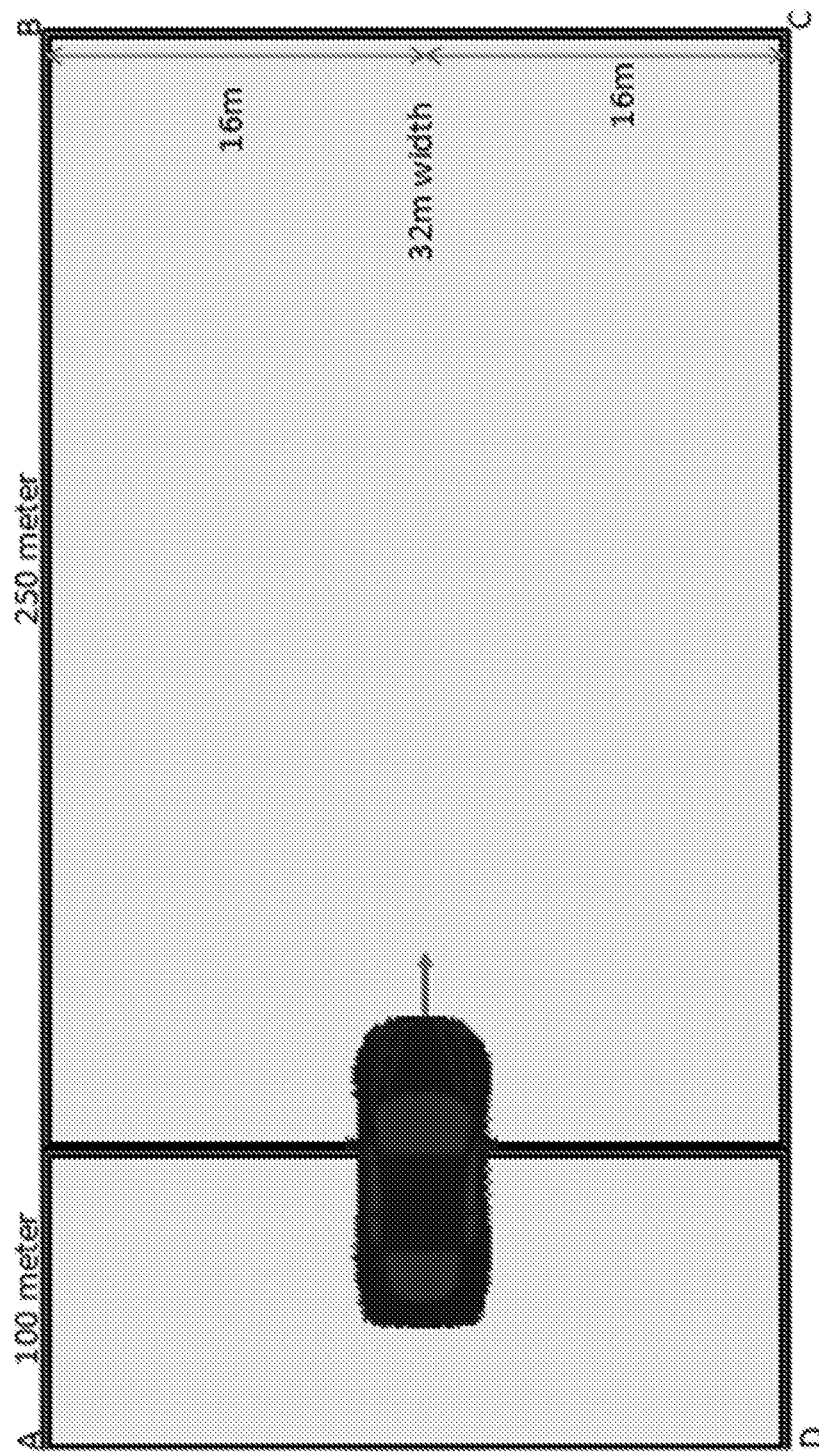
FIG. 2 is a diagram illustrating a region of interest (ROI) of a CACC system on a straight road.

FIG. 2 is a diagram illustrating a region of interest (ROI) of a CACC system on a straight road.

The CACC system may take interest in only neighboring vehicles that come into the region of interest (ROI). Information that comes from a vehicle that is out of the ROI may be considered meaningless information in controlling the vehicle. Accordingly, the CACC system may perform a control operation using only information that comes from vehicles that are within the region of interest to reduce a load that is applied to the CACC system.

Referring to FIG. 2, the region of interest may be set to have lengths of about 16 m and about 32 m in left and right directions, respectively, on the basis of the center of the vehicle in which the CACC system is mounted. Further, the region of interest may be set to have a length of about 250 m in the front direction and a length of about 100 m in the rear direction around a driver's seat. In the case of a curved road, the region of interest may be set to bend the region of interest that is set on a straight road to match the curvature of the curved road.

Further, the CACC system may set a target vehicle and a potential vehicle of interest (PVOI). The target vehicle means a front vehicle that is followed by the subject vehicle that is mounted with the CACC system. That is, the CACC system uses a distance that is maintained between the subject vehicle and the target vehicle when calculating the time gap, and the target vehicle becomes a target for which the time gap is constantly maintained. The potential vehicle of interest means a vehicle which is within the region of interest and is connected to the CACC system through the V2V communications. The potential vehicle of interest may be a vehicle that can exert an influence on the speed control of the subject vehicle that is mounted with the CACC system. A vehicle which is in a side lane and is expected to join in the lane of the subject vehicle or a vehicle which is in the same lane as the subject vehicle and the target vehicle and is in front of the target vehicle may be the potential vehicle of interest, and the potential vehicle of interest may become the target vehicle.

Figure 3:
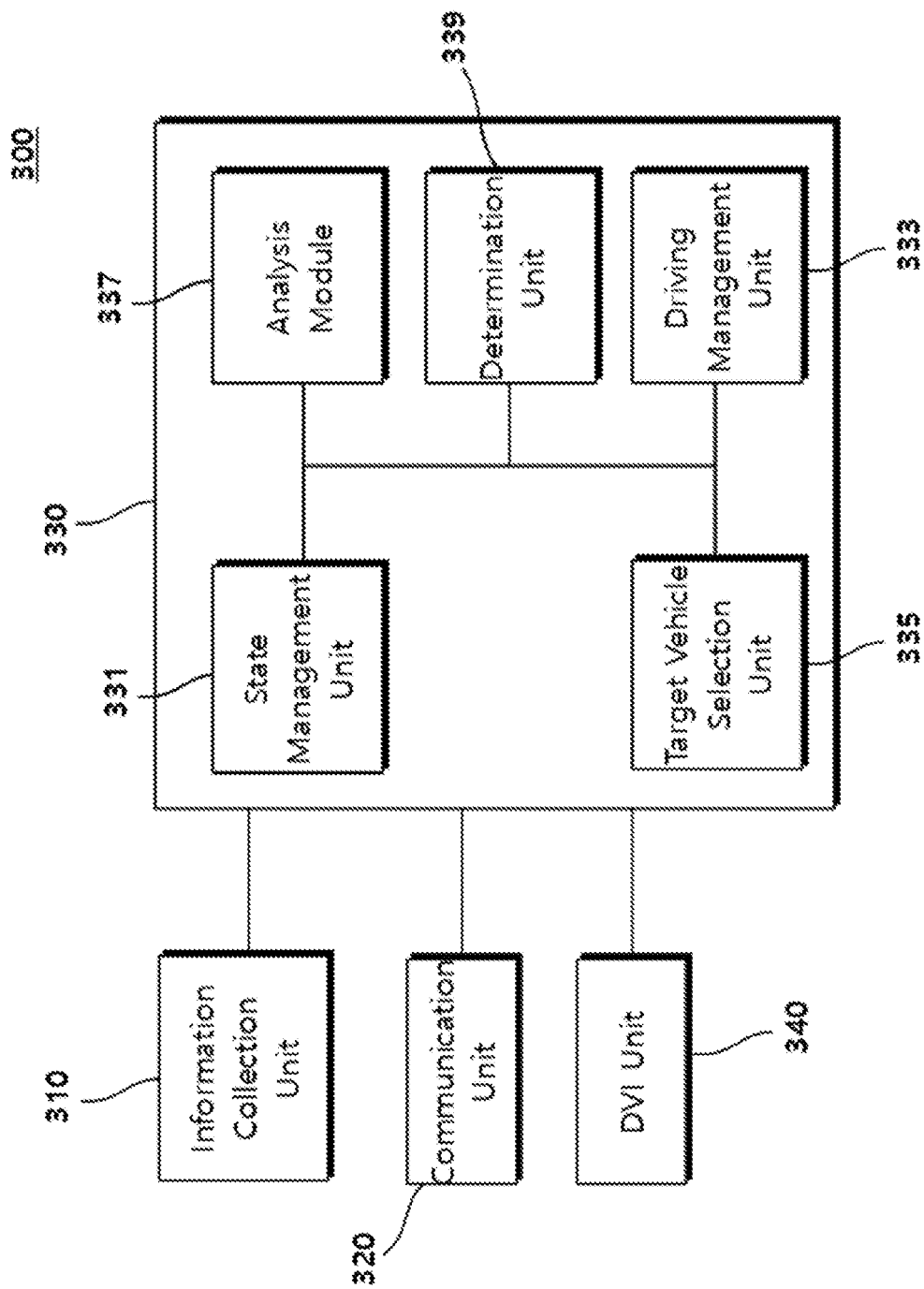
FIG. 3 is a block diagram illustrating the configuration of a CACC system according to an embodiment of the present disclosure.

FIG. 3 is a block diagram illustrating the configuration of a CACC system according to an embodiment of the present disclosure.

Referring to FIG. 3, a CACC system according to the present disclosure may include an information collection unit 310, a communication unit 320, a DVI unit 340, and a control unit 330. The control unit (or "controller") 330 may include a state management unit 331, a driving management unit 333, a target vehicle selection unit 335, an analysis module 337, and a determination unit 339.

The communication unit 320 may receive a road speed limit, a time gap (time difference between a subject vehicle and a front vehicle), and/or other standard messages from RSE 10 based on V2I communications. That is, the CACC system 300 of the vehicle may receive not only a recommended set speed or time gap information but also information related to a road, traffic, weather, etc. from the regional traffic control system through the V2I communications. In particular, the communication unit 320 may receive road information (road class and traffic information) of a region in which the vehicle currently travels, and may transfer the road information to the control unit 330. Further, the communication unit 320 may receive neighboring vehicle information that includes driving information (speed and acceleration) of a neighboring vehicle 20 through V2V communications with at least one neighboring vehicle 20, or may transfer its own vehicle information to the neighboring vehicle 20. Particularly, in this case, the communication unit may provide not only its own driving information but also identification information or driving information of a forward vehicle to the neighboring vehicle 20. In the case where the neighboring vehicle provides only the identification information, the communication unit may acquire vehicle information of a forward vehicle of the neighboring vehicle that has sent the identification information using information that comes from the neighboring vehicle having the identification information. Accordingly, the subject vehicle can acquire the vehicle information even with respect to the target vehicle and a forward vehicle of the target vehicle. On the other hand, in the case of transmitting only the identification information, the amount of data that is transmitted by the respective vehicles can be reduced.

Further, the information collection unit 310 may collect subject vehicle information that is required to control the CACC system and surrounding environment information that is collected using sensors. The subject vehicle information may include subject vehicle driving speed, throttle, and brake control information, and the surrounding environment information may include information of the neighboring vehicle 20 that is collected through the sensors. In particular, if the target vehicle exists in front of the subject vehicle, the information collection unit may collect the surrounding environment information through calculation of the driving speed of the target vehicle and a gap distance based on radar or lidar.

Figure 4:
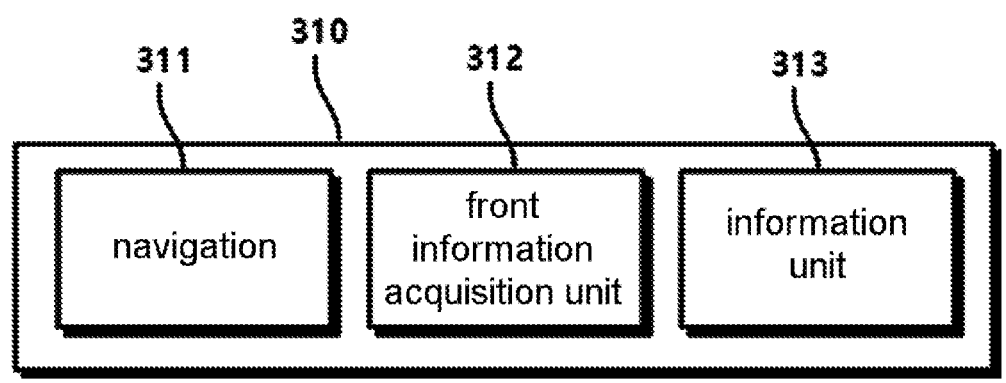
FIG. 4 is a diagram illustrating an example of an information collection unit 310 according to the present disclosure.

FIG. 4 is a diagram illustrating an example of an information collection unit 310 according to the present disclosure.

Referring to FIG. 4, the information collection unit 310 may include a navigation 311, a front information acquisition unit 312, and an information unit 313.

The navigation 311 may receive signals that are transmitted from a plurality of GPS satellites, and may display a map, related information, and information on points of interest to a driver through detection of position information that is included in the received signals. Further, the navigation 311 may display various kinds of information on general vehicle driving expectation routes. Particularly, in the same manner as the communication unit 320, the navigation 311 may collect and transfer road information (road class and traffic information) of a region in which the vehicle currently travels to the control unit 330.

The front information acquisition unit 312 may acquire lane data from image data that is provided from a front camera and distance information of stopped objects through radar data or laser data, and may transfer the acquired data and information to the control unit 330.

Specifically, the front information acquisition unit 312 may calculate a lane width, horizontal position of the vehicle on a lane, distances from side lanes, lane shape, and curvature radius of a road through processing of the image that is acquired through the camera installed on the front portion of the vehicle.

Further, the front information acquisition unit 312 may sense forward vehicles that travel in front, stopped objects including structures installed around the road, and vehicles that come from an opposite lane using laser, lidar, or radar, and may calculate an inter-vehicle distance from the forward vehicle that travels in the same direction or a distance from the stopped object.

The information unit 313 may measure a driving speed of the subject vehicle that is measured on the basis of revolutions of an output shaft of a transmission, steering angle change according to an operation of a steering wheel, throttle, and brake control information, and may transmit the measured information to the control unit 330.

Referring again to FIG. 3, the DVI unit 340 may receive setting information that is input from a driver through a driver-vehicle interface, and may transfer information that is needed to be notified to the driver, such as state information of the CACC system 300 and warning information that may be generated by the CACC system 300, to the driver. As an example, the driver may input a target speed and/or target time gap through the DVI unit 340, and the CACC system 300 may operate the subject vehicle to match the input target speed and/or target time gap. As another example to be described later, the state information on whether the CACC system is in an off state, a standby state, or an activation state may be notified to the driver through the DVI unit 340.

Further, the CACC system may further include a driving unit (not illustrated). The driving unit may control a throttle and/or a brake according to a control signal of the control unit 330 to be described later.

The control unit 330 may control the driving speed of the subject vehicle based on the information that is acquired by the information collection unit 310 and the communication unit 320. That is, the control unit 330 may select a target vehicle to be followed by the subject vehicle based on the vehicle information of the neighboring vehicles that is acquired by the communication unit 320 and the driving information of the forward vehicle that is collected by the information collection unit 310, may control the driving speed of the subject vehicle based on the target speed of the subject vehicle if the target vehicle to be followed by the subject vehicle is not selected, and may control the driving speed of the subject vehicle based on speed information of the target vehicle, speed information of the subject vehicle, and the target time gap if the target vehicle to be followed by the subject vehicle is selected. In this case, a user may set the target speed and the target time gap, or the CACC system may automatically set the target speed and the target time gap to match the situation based on the information that is acquired by the information collection unit 310 and the communication unit 320.

In order to perform the above-described functions, the control unit 330 may further include a state management unit 331, a driving management unit 333, and a target vehicle selection unit 335, and may further include an analysis module 337 and a determination unit 339.

The target vehicle selection unit 335 may select a potential vehicle of interest and the target vehicle based on the vehicle information of a plurality of neighboring vehicles 20 that comes through the communication unit 320. The potential vehicle of interest means a neighboring vehicle that exists in the region of interest as described above. If the neighboring vehicle is within the region of interest based on position information that is received from the neighboring vehicle and position information of the subject vehicle, the corresponding neighboring vehicle may be selected and registered as the potential vehicle of interest. In addition, the forward vehicle that is just in front of the subject vehicle among the potential vehicles of interest may be selected as the target vehicle. Particularly, in the case of the target vehicle, it is required to verify the target vehicle with very high reliability, and thus the target vehicle may be selected through verification of three kinds of conditions below based on the forward vehicle information that is collected through the information collection unit 310.

1. Using position information of potential vehicles of interest, the potential vehicles of interest (hereinafter referred to as "first group of potential vehicles of interest") that travel in the same lane as the lane of the subject vehicle are selected.

2. Potential vehicles of interest (hereinafter referred to as "second group of potential vehicles of interest"), in which existence range information that is received from each potential vehicle of interest of the first group of potential vehicles of interest exists within one value of (0.1×(the range measured by the sensor)) and (0.7×(the length of each potential vehicle of interest)) that is larger than the other value, are selected. In this case, if the length of the potential vehicle of interest is not known, the value of (0.7×(the length of each potential vehicle of interest)) may be about 3.3 m.

3. Potential vehicles of interest (hereinafter referred to as "third group of potential vehicles of interest"), in which a difference between speed information that is received from each potential vehicle of interest of the second group of potential vehicles of interest and the speed that is measured by the sensor is within 1 m/s, are selected.

It is general that only one potential vehicle of interest is included in the third group of potential vehicles of interest that is selected through verification of the three kinds of conditions. However, in the case where two or more potential vehicles of interest are included in the third group of potential vehicles of interest, the potential vehicle of interest that is in the closest position may be selected as the target vehicle based on the position information of each potential vehicle of interest of the third group of potential vehicles of interest.

If the existence/nonexistence of the target vehicle or potential vehicle of interest is determined by the target vehicle selection unit 335, such information may be transferred to the state management unit 331, the driving management unit 333, and/or the analysis module 337 to be used to match the purposes of the respective functions.

The state management unit 331 may manage the state of the CACC system. The CACC system may be in an off state, a standby state, or an activation state in accordance with the state of the subject vehicle, and existence/nonexistence of the target vehicle and/or potential vehicle of interest.

Figure 5:
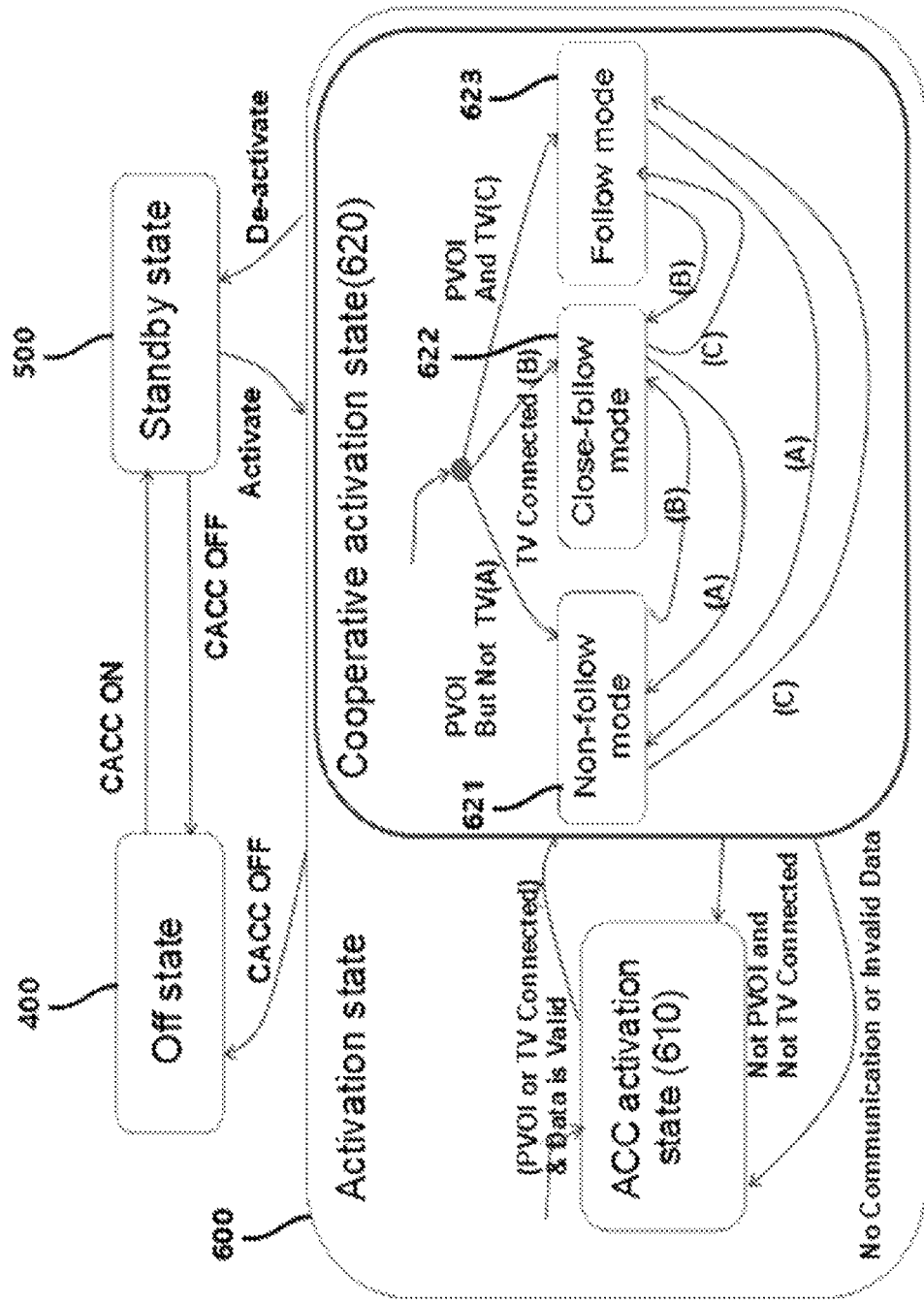
FIG. 5 is a diagram illustrating state transitions of a CACC system according to an embodiment of the present disclosure.

FIG. 5 is a diagram illustrating state transitions of a CACC system according to an embodiment of the present disclosure.

Referring to FIG. 5, the CACC system may include an off state 400 in which the CACC system does not operate, a standby state 500 in which the CACC system operates, but does not control the driving speed of the subject vehicle, and an activation state 600 in which the driving speed of the subject vehicle is controlled. In particular, the activation state 600 may include an ACC activation state 610 in which the driving speed of the subject vehicle is controlled using only the information that is acquired from the subject vehicle in a state where there is no vehicle in the region of interest that is connected through the V2V communications, and a cooperative activation state 620 in which there is a neighboring vehicle in the region of interest that is connected through the V2V communications, and the driving speed of the subject vehicle is controlled using the information from the neighboring vehicle that is acquired through the V2V communications and the information that is acquired from the subject vehicle.

The off state 400 is a state in which the CACC system does not operate. That is, in the off state 400, the CACC system performs no function. The CACC system may be transitioned to the off state 400 through stalling of the subject vehicle or driver's manual operation.

The standby state 500 is a state in which the CACC system stands to be activated, and in the standby state 500, the CACC system does not perform the speed control. If the subject vehicle starts up, the CACC system may be transitioned to the standby state 500 after automatic completion of self-diagnosis in the off state 400, or may be transitioned from the off state 400 to the standby state 500 by the driver's manual operation. Further, the CACC system may be transitioned to the standby state 500 if a driver's manual control input, such as brake or throttle control, is received in the activation state 600.

The activation state 600 is a state in which the CACC system is activated to perform the speed control. As described above, the activation state 600 may include the ACC activation state 610 and the cooperative activation state 620. If there is not a potential vehicle of interest or a target vehicle that is connected through the V2V communications, the CACC system operates in the ACC activation state 610, whereas if there is a potential vehicle of interest or a target vehicle that is connected through the V2V communications, the CACC system operates in the cooperative activation state 620. The CACC system may be transitioned to the activation state 600 if the speed of the subject vehicle becomes higher than a predetermined speed (hereinafter referred to as a "first speed") in the standby state 500. Further, if the speed of the subject vehicle is lowered below the first speed in the activation state 600, the CACC system may forbid acceleration or may be transitioned to the standby state 500.

When the CACC system is transitioned to the activation state 600, it may first operate in the ACC activation state 610. In the ACC activation state 610, cruise control may be performed to match the highest speed that is set like the ACC system in the related art, or following control may be performed if a front vehicle exists. In the ACC activation state 610, if a potential vehicle of interest or a target vehicle that is connected through the V2V communications exists and data that is received from the potential vehicle of interest or the target vehicle is reasonable, the CACC system may be transitioned to the cooperative activation state 620. In an embodiment, if information related to the potential vehicle of interest or the target vehicle that is received using the V2V communications coincides with the vehicle information that is acquired by the sensor of the subject vehicle through the information collection unit 310, it may be verified that the data is reasonable. Such verification may be performed by the target vehicle selection unit 335.

Further, if the potential vehicle of interest or the target vehicle does not exist in the cooperative activation state 620, the CACC system may be transitioned to the ACC activation state 610, and even if the V2V communications are not performed or only unreasonable data is received, the CACC system may be transitioned to the ACC activation state 610.

The cooperative activation state 620 of the CACC system may include a non-follow mode 621, a close-follow mode 622, and a follow mode 623. The non-follow mode 621 is a mode that is performed in the case where the potential vehicle of interest is connected through the V2V communications, but the target vehicle does not exist, and the speed control of the subject vehicle through the CACC system may be affected by data that is received from the potential vehicle of interest.

The close-follow mode 622 is a mode that is performed in the case where the target vehicle that is connected through the V2V communications exists, and in this case, the speed control of the subject vehicle through the CACC system may be affected by information that comes from the connected target vehicle and potential vehicle of interest.

The follow mode 623 is a mode that is performed in the case where the target vehicle exists, but is not connected through the V2V communications. In this case, the target vehicle may be sensed by the sensor of the subject vehicle, and such information may be acquired by the information collection unit 310. In this case, the speed control of the subject vehicle through the CACC system may be affected by information that comes from the connected potential vehicle of interest and the target vehicle that is sensed by the sensor.

The CACC system may operate in one of the above-described three kinds of modes in the cooperative activation state 620, and the three kinds of modes may be determined depending on whether the target vehicle exists and whether the target vehicle is connected through the V2V communications.

That is, referring to FIG. 4, if the target vehicle does not exist in the region of interest, but the potential vehicle of interest exists in the cooperative activation state 620, the CACC system may be transitioned (A) to the non-follow mode 621, and if the target vehicle that is connected through the V2V communications exists, the CACC system may be transitioned (B) to the close-follow mode. If the target vehicle that is not connected through the V2V communications exists in the region of interest and the potential vehicle of interest also exists in the region of interest, the CACC system may be transitioned (C) to the follow mode 623.

If neither the connected target vehicle nor the potential vehicle of interest exists, the CACC system may be transitioned to the ACC activation state 610.

Maximum and minimum requirements per mode that can be controlled in the activation state 600 of the CACC system may be defined as in Table 1 below.

TABLE 1

| Target vehicle existence | Target vehicle connection | PVOI existence | CACC mode | Minimum time gap | Maximum Deceleration | Maximum Acceleration | Whether to use data received through V2V communications |
|---|---|---|---|---|---|---|---|
| no | no | no | ACC activation state: Speed control mode | 0.8 s | 3.5 m/s^2 | 2.0 m/s^2 | Unused |
| yes | no | no | ACC activation state: Follow mode | 0.8 s | 3.5 m/s^2 | 2.0 m/s^2 | Unused |
| no | no | yes | Cooperative activation state: Non-follow mode | 0.8 s | 3.5 m/s^2 | 2.0 m/s^2 | Used |
| yes | yes | no | Cooperative activation state: Close-follow mode | 0.5 s | 5 m/s^2 | 2.75 m/s^2 | Used |
| yes | yes | yes | Cooperative activation state: Close-follow mode | 0.5 s | 5 m/s^2 | 2.75 m/s^2 | Used |
| yes | no | yes | Cooperative activation state: Follow mode | 0.8 s | 3.5 m/s^2 | 2.0 m/s^2 | Used |

Referring to Table 1, the CACC system is unable to set the minimum time gap to 0.5 s or less, is unable to perform deceleration control of 5 m/s^2 or more through control of maximum brake, and is unable to perform acceleration control of 2.75 m/s^2 or more through control of throttle.

Referring again to FIG. 3, the state management unit 331 may manage the state of the CACC system 300 according to the above-described method, and if the CACC system 300 is in an activation state, the driving management unit 333 may control the driving speed of the subject vehicle. In the case of the CACC system 300, the driving speed is generally controlled so that the driver can perform driving to match the set target speed. However, if the target vehicle exists, the driving speed may be controlled so that the subject vehicle can follow the target vehicle.

According to the present disclosure, the CACC system may acquire a driving pattern of the target vehicle based on road, traffic, and weather information, and may control the driving speed of the subject vehicle based on the acquired driving pattern of the target vehicle.

For this, the control unit 330 may additionally include the analysis module 337 and the determination unit 339.

The analysis module 337 may acquire the driving pattern of the target vehicle based on at least one of the subject vehicle position that is collected using the information collection unit 310 that includes the navigation 311, the front information acquisition unit 312, and the information unit 313 and the communication unit 320, lane information, steering angle information of left and right lanes, and guardrail curve information using distance measurement from a stopped object, and based on this, the driving management unit 333 may control the driving speed of the subject vehicle through control of the steering angle, speed change, and braking.

In particular, the analysis module 337 can secure the stability of the CACC system and improve the reliability by verifying the lane information that is acquired from the image data through the front information acquisition unit 312 and correcting an error that is found through the verification. That is, the analysis module 337 may correct the lane information based on the curve information according to the front stopped object through detection of an unparallel state where left/right steering angles of left/right lane information on the driving road has a difference that is equal to or larger than a specific reference value. Here, the front stopped object may be, for example, a guardrail that is formed along the road lane.

Further, the analysis module 337 may acquire driving pattern data of the target vehicle based on the road information (road class and traffic information) that is acquired through the information collection unit 310 and the communication unit 320.

Here, the road class and traffic information may be indicated in Table 2 and Table 3 below.

TABLE 2

Road Class Classification

| | |
|---|---|
| Road Class 0 | Expressway, Freeway |
| Road Class 1 | Urban expressway, Arterial |
| Road Class 2 | National road, County |
| Road Class 3 | Local road, Collector |
| Road Class 4 | Regional road/Other road, Local/Unpaved Local |

The analysis module 337 may acquire the road class of the road on which the subject vehicle currently travels by analyzing the road characteristics, through the communication unit 320, or using the navigation 311 and map information. Table 3 below shows an example of a responsible speed level setting on the basis of driving speeds and inter-vehicle distances for the respective road classes (expressway, urban expressway, national road, local road, and regional road/other road).

TABLE 3

Road Traffic Information Classification

| Division | Display color | Determination |
|---|---|---|
| No information | No display | |
| Free | Green | Expressway (70 km or more), Urban expressway (60 km or more), General road (30 km or more) |
| Slow | Yellow | Expressway (30~69 km or more), Urban expressway (30~59 km or more), General road (30 km or more) |
| Delay | Red | Expressway (below 30 km), Urban expressway (below 30 km), General road (below 15 km) |

Referring to Table 3, as for road traffic information, traffic operation information of a region in which the vehicle travels may be collected on the basis of the road class of the road in which the vehicle travels. That is, the analysis module 337 may determine the road situations (free, slow, and delay) in a driving direction of the subject vehicle based on the information that is acquired using the information collection unit 310 and the communication unit 320, and may display the road traffic information in the driving direction of the subject vehicle based on the road situations with colors (green, yellow, and red) that are selected using the DVI unit 340.

The analysis module 337 may generate driving pattern data of the target vehicle based on the acquired road information of the region in which the vehicle currently travels.

Here, the driving pattern data of the target vehicle is data for adjusting the road classes that correspond to the respective classes and the inter-vehicle distance from the target vehicle according to a limit speed of the road on which the vehicle currently travels.

Accordingly, the analysis module 337 may find the driving pattern data of the target vehicle that is equal to the inter-vehicle distance information from the target vehicle that is acquired from the information collection unit 310 and the communication unit 320, and may transfer the found driving pattern data to the determination unit 339.

The determination unit 339 may control responsibility (i.e., a responsible speed level of the subject vehicle in the CACC system) based on the driving pattern data of the target vehicle.

FIG. 6 is a reference diagram as to how the determination unit 339 controls a responsible speed level.

Referring to FIG. 6, the determination unit 339 may control the responsible speed level through matching of the inter-vehicle distance information from the target vehicle, which is received from the analysis module 337, with the driving pattern data of the target vehicle.

Accordingly, the determination unit 339 may determine information of the road on which the vehicle travels, that is, the road situation (free, slow, or delay) in the driving direction of the vehicle, which is acquired through the information collection unit 310 and/or the communication unit 320, display the road information in the driving direction of the vehicle based on the road situation with the selected color (green, yellow, or red), and control the responsible speed level of the subject vehicle (labeled "Responsibility" in FIG. 6) based on the acquired forward vehicle speed and inter-vehicle distance.

As an example, if the road class is expressway, the traffic situation is "free", the weather is "clean", the target vehicle speed is "low", and the inter-vehicle distance is normal, the responsibility may be set to "normal". In contrast, if the road class is expressway, the traffic situation is "free", the target vehicle speed is "high" in a rainy day, and the inter-vehicle distance is "long", the responsibility may be set to "fast".

As described above, the CACC system may set the inter-vehicle distance and the responsible speed level based on the road traffic information and the target vehicle speed, and may follow the target vehicle.

Figure 7:
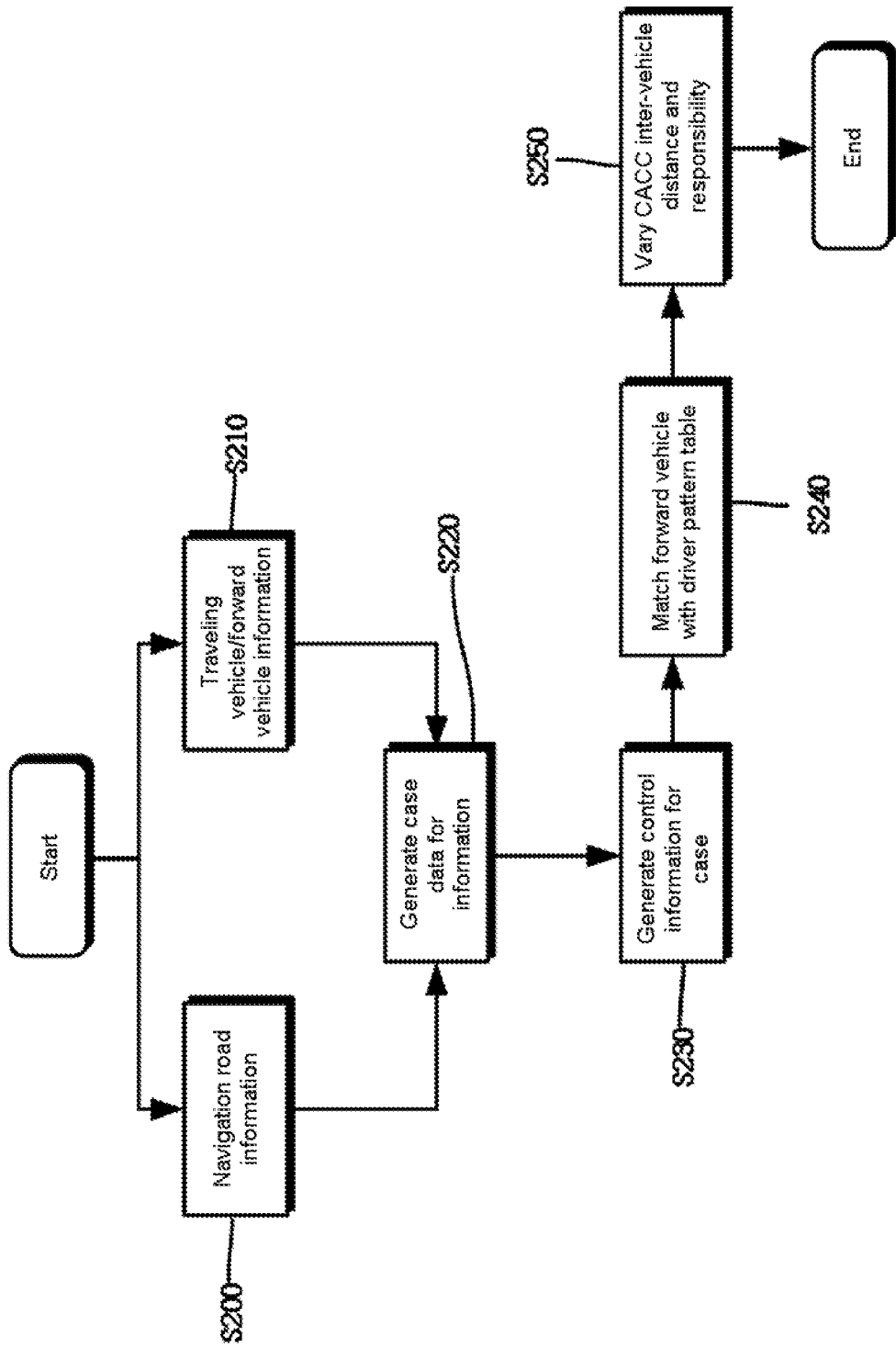
FIG. 7 is a flowchart illustrating a following control method for following a target vehicle of a CACC system according to an embodiment of the present disclosure.

FIG. 7 is a flowchart illustrating a following control method for following a target vehicle of a CACC system according to an embodiment of the present disclosure.

Referring to FIG. 7, the CACC system collects the road information that includes the road class of the region in which the vehicle currently travels and the traffic information using the communication unit 320 and/or the navigation 311 and map information (S200). Then, the CACC system collects the inter-vehicle distance from the target vehicle and the driving speed information of the subject vehicle based on the information that is acquired through the information collection unit 310 and the communication unit 320 with respect to the target vehicle that is selected by the target vehicle selection unit 335 (S210).

The analysis module 337 generates the driving pattern data of the target vehicle based on the subject vehicle position that is collected through the communication unit 320 and/or the information collection unit 310, lane information, steering angle information of the left and right lanes, distance measurement from a stopped object, and/or the road information of the region in which the vehicle currently travels (S220).

The analysis module 337 may generate control information for adjusting the road class and the corresponding inter-vehicle distance from the target vehicle according to the limit speed of the road on which the vehicle currently travels (S230), and match the inter-vehicle distance from the target vehicle with the driving pattern data of the target vehicle (S240). The determination unit 339 may control the responsible speed level of the subject vehicle in the CACC system based on the matched driving pattern data of the target vehicle (S250).

As described above, since the inter-vehicle distance and the responsible speed level that are required by the CACC system are automatically set, the driver setting menu can be simplified, and driver's use convenience can be improved. Further, automatic driving safety of the CACC system can be sought.

On the other hand, it should be understood that the CACC is exemplified in the specification for convenience in explanation. The CACC is merely one of various ADAS functions, and the CACC implementation that is proposed according to the present disclosure may also be used to implement other related ADAS functions. For example, the proposed method according to the present disclosure may be used even to implement one or a combination of ADAS functions, such as CACC, ACC (Adaptive Cruise Control), LCDAS (Lane Change Decision Aid System), LDWS (Lane Departure Warning System), LKAS (Lane Keeping Assistance System), RBDPS (Road Boundary Departure Prevention System), PDCMS (Pedestrian Detection and Collision Mitigation System), CSWS (Curve Speed Warning System), FVCWS (Forward Vehicle Collision Warning System), and LSF (Low Speed Following).

In one or more exemplary embodiments, explained functions may be implemented by hardware, software, firmware, or a certain combination thereof. In the case of implementation by software, these functions may be stored or transmitted as one or more instructions or codes on a computer readable medium. The computer readable medium includes both a communication medium and a computer storage medium which include a certain medium that facilitates transfer of computer programs from one place to another place. The storage medium may be a certain usable medium that can be accessed by a computer. As an example that is not limitation, such a computer readable medium may include a RAM, ROM, EEPROM, CD-ROM or another optical disk storage, magnetic disc storage or another magnetic storage device, or another medium that can be accessed by a computer, and may be used to transfer or store desired program codes in the form of instructions or data structures. Further, a certain connection may be properly called a computer readable medium. For example, if software is transmitted from a web site, a server, or another remote source using a coaxial cable, optical fiber cable, twisted dual lines, digital subscriber line (DSL), or wireless technology, such as infrared, radio, or ultrahigh frequency, the coaxial cable, optical fiber cable, twisted dual lines, DSL, or wireless technology, such as infrared, radio, or ultrahigh frequency is included in definition of the medium. The disk and disc, as used herein, include a compact disc (CD), laser disc, optical disc, digital versatile disc (DVD), floppy disk, and blu-ray disc. In general, the disk magnetically reproduces data, whereas the disc optically reproduces data by laser. The above-described combinations should also be included in the range of the computer readable medium.

In the case where the embodiments are implemented by program codes or code segments, it should be recognized that the code segment can indicate procedures, functions, subprograms, programs, routines, subroutines, modules, software packages, classes, or instructions, data structures, or a certain combination of program commands. The code segment may be connected to another code segment or a hardware circuit through transfer and/or reception of information, data, arguments, parameters, or memory content. The information, arguments, parameters, and data may be transferred, sent, or transmitted using a certain proper means that includes memory share, message transfer, token transfer, and network transmission. Additionally, in some aspects, steps and/or operations of methods or algorithms may reside as one, a combination, or a set of codes and/or commands on a machine-readable medium and/or a computer readable medium that may be integrated as computer program things.

In the case of software implementation, the above-described technologies may be implemented by modules (e.g., procedures or functions) that perform the above-described functions. Software codes may be stored in memory modules and may be executed by processors. The memory unit may be implemented in the processor or outside the processor, and in this case, the memory unit may be communicably connected to the processor by various means as is known in the art.

In the case of hardware implementation, processing units may be implemented in at least one of an application-specific integrated circuit (ASIC), a digital signal processor (DSP), a digital signal processing device (DSPD), a programmable logic device (PLD), a field programmable gate array (FPGA), a processor, a controller, a microcontroller, a microprocessor, other electronic units that are designed to perform the functions as described above, and their combinations.

As described above, one or more embodiments are exemplified. All possible combinations of components or methods are not described for the purpose of explaining the above-described embodiments, but those skilled in the art may recognize that many additional combinations and substitutions of various embodiments are possible. Accordingly, the above-described embodiments may include all substitutions, modifications, and changes within the true meaning and scope of appended claims. Further, the term "comprises" and/or "composed of" used in the description and claims means that one or more other components, steps, operation and/or existence or addition of devices are not excluded in addition to the described components, steps, operation and/or devices.

As is used herein, the term "estimate" or "estimation" means a process for determining or estimating the system, environment, and/or user's state from one set of observations that is generally seized by events and/or data. The estimation may be used to identify a specific situation or operation, and may generate, for example, probability distribution of states. The estimation may be in probability, and may be calculation of probability distribution of corresponding states based on consideration of the data or events. The estimation may be technologies that are used to construct upper-level events from one set of events and/or data. Such estimation may estimate new events or operations from a set of observed events and/or stored event data, whether the events are closely correlated in time, and whether the events and data come from one or several events and data sources.

Further, the term "component", "module" or "system", as used in the description of the present disclosure, is not limited thereto, but may include hardware, firmware, hardware and software combination, software, or computer related entity, such as software being executed. For example, a component is not limited to its name, but may be a process that is executed on a processor, a processor, an object, executable execution thread, a program and/or a computer. Exemplarily, an application that is driven on an operation device and an operation device may be components in all. One or more components may reside in a process and/or execution thread, and components may be concentrated into one computer and/or may be distributed between two or more computers. Further, such components may be executed from various kinds of computer readable media in which various kinds of data structures are stored. The components may communicate with each other by a local and/or remote process according to signals having one or more data packets (e.g., data from a local system, another component of a distributed system, and/or a certain component that interacts with other systems by the signal through a network, such as the Internet).

It will be understood that the above-described embodiments are exemplary to help easy understanding of the contents of the present disclosure and do not limit the scope of the present disclosure. Accordingly, the scope of the present disclosure is defined by the appended claims, and it will be construed that all corrections and modifications derived from the meanings and scope of the following claims and the equivalent concept fall within the scope of the present disclosure.

What is claimed is:

1. A cooperative adaptive cruise control (CACC) system that is provided in a subject vehicle to control a driving speed of the subject vehicle, comprising:

a communication unit configured to receive vehicle information including positions of neighboring vehicles and driving information, using at least one of V2V (Vehicle to Vehicle) and V2I (Vehicle to Infrastructure) communications;

an information collection unit configured to collect driving information of a forward vehicle, vehicle information of the subject vehicle using sensors provided on the subject vehicle; and a control unit configured to select a target vehicle to be followed by the subject vehicle based on the vehicle information of the neighboring vehicles that is acquired by the communication unit and the driving information of the forward vehicle that is collected by the information collection unit, wherein, when potential vehicles of interest are not existed in a region of interest (ROI), the CACC system operates in an activation state that controls the driving speed of the subject vehicle based on a target speed of the subject vehicle, and wherein, when the potential vehicles of interest are existed in the ROI, the CACC system operates in a cooperative activation state including a non-follow mode, a close-follow mode, and a follow mode, wherein the CACC system that is operated in the cooperative activation state is further configured to:

operate in the close-follow mode that controls the driving speed of the subject vehicle based on information received from the selected target vehicle and the potential vehicles of interest, when a first potential vehicle of interest connected to the CACC system through the V2V communication is selected as the target vehicle;

operate in the follow mode that controls the driving speed of the subject vehicle based on information sensed by the sensor and the information received from the potential vehicles of interest, when a second potential vehicle of interest not connected to the CACC system through the V2V communication is selected as the target vehicle, and operate in the non-follow mode that controls the driving speed of the subject vehicle based on the information received from the potential vehicles of interest, when the potential vehicles of interest are not travel in the same lane or are not satisfied the distance condition and the speed condition.

2. The CACC system according to claim 1, further comprising a driving unit configured to control a throttle and a brake, wherein the control unit controls the driving unit to control the driving speed of the subject vehicle.

3. The CACC system according to claim 1, wherein the communication unit is further configured to receive road information of a region in which the subject vehicle travels using the V2I, wherein the information collection unit is further configured to collect the road information of the region in which the subject vehicle travels using sensors provided on the subject vehicle, wherein the control unit is further configured to generate a plural pieces of case information using the road information collected by the communication unit and the information collection unit, to generate control information for the generated plural cases using driving information of the target vehicle and the vehicle information of the subject vehicle, and to control an inter-vehicle distance and a responsible speed level of the subject vehicle in the CACC system based on a driving pattern of the target vehicle according to the generated control information, and wherein the CACC system is further comprises a driver vehicle interface (DVI) unit configured to receive at least one of a target speed and a target time gap from a driver and to notify the driver of state information of the CACC system and a driving pattern of the target vehicle.

4. The CACC system according to claim 3, wherein the information collection unit comprises:
  a navigation configured to collect the road information of the region in which the subject vehicle currently travels;
  a front information acquisition unit configured to collect information of the forward vehicle that travels in front of the subject vehicle; and
  an information unit configured to collect information of the traveling subject vehicle.

5. The CACC system according to claim 3, wherein the control unit comprises:
  a state management unit configured to manage a state of the CACC system;
  a target vehicle selection unit configured to select the target vehicle to be followed by the subject vehicle based on the vehicle information of the neighboring vehicles that is acquired from the communication unit and the driving information of the forward vehicle that is collected by the information collection unit;
  an analysis module configured to generate the plural pieces of case information using the road information collected by the communication unit and the information collection unit, to generate the control information for the generated plural cases using the driving information of the target vehicle and the vehicle information of the subject vehicle, to determine the driving pattern of the target vehicle according to the generated control information, and to determine the inter-vehicle distance based on the determined driving pattern;
  a determination unit configured to determine the responsible speed level of the subject vehicle in the CACC system based on the determined driving pattern that is transferred from the analysis module; and
  a driving management unit configured to control the driving speed of the subject vehicle according to the determined inter-vehicle distance and the responsible speed level.

6. The CACC system according to claim 5, wherein the state management unit displays the state of the CACC system as one of an off state in which the CACC system does not operate, a standby state in which the CACC system operates, but does not control the driving speed of the subject vehicle, an ACC activation state in which the driving speed of the subject vehicle is controlled using only the information that is acquired from the subject vehicle in a state where there is no vehicle in a region of interest that is connected through the V2V communications, and a cooperative activation state in which there is the neighboring vehicle in the region of interest that is connected through the V2V communications, and the driving speed of the subject vehicle is controlled using the information from the neighboring vehicle that is acquired through the V2V communications and the information that is acquired from the subject vehicle.

7. CACC system according to claim 5, wherein the analysis module generates control information of the subject vehicle for maintaining a set distance from the target vehicle based on driving pattern data of the target vehicle.

8. The CACC system according to claim 5, wherein the analysis module matches control information of the subject vehicle with the road information of the region in which the subject vehicle currently travels.

9. The CACC system according to claim 1, wherein the information collection unit further comprises a time sensor, an illumination sensor, and a rain sensor configured to collect information on time and weather of the region in which the subject vehicle currently travels.

10. The CACC system according to claim 1, wherein the control unit is configured to select the target vehicle by:
  selecting vehicles that travel in the same lane as the subject vehicle as a first group of potential vehicles of interest;
  selecting, from the first group of potential vehicles of interest, vehicles that exist within a predetermined distance as a second group of potential vehicles of interest, wherein distance is measured by both the V2V communication and the sensor provided on the subject vehicle;
  selecting, from the second group of potential vehicles of interest, vehicles in which a difference between speed information received by the V2V communication and speed measured by the sensor is within a predetermined value as a third group of potential vehicles of interest; and
  selecting one vehicle in the third group of potential vehicles of interest as the first target vehicle to be followed by the subject vehicle.

11. A method for controlling speed level of a subject vehicle in a cooperative adaptive cruise control (CACC) system that is provided in the subject vehicle, comprising:
  receiving, using V2V (Vehicle to Vehicle) and V2I (Vehicle to Infrastructure) communications, vehicle information including positions of neighboring vehicles and driving information,
  collecting, using sensors provided on the subject vehicle, driving information of a forward vehicle and vehicle information of the subject vehicle; and
  selecting a target vehicle to be followed by the subject vehicle based on the received vehicle information and the collected driving information of a forward vehicle and the vehicle information of the subject vehicle,
  wherein, when potential vehicles of interest are not existed in a region of interest (ROI), the CACC system operates in an activation state that controls the driving speed of the subject vehicle based on a target speed of the subject vehicle, and
  wherein, when the potential vehicles of interest are existed in the ROI, the CACC system operates in a cooperative activation state including a non-follow mode, a close-follow mode, and a follow mode,
  wherein the CACC system operates in the close-follow mode that controls the driving speed of the subject vehicle based on information received from the selected target vehicle and the potential vehicles of interest, when a first potential vehicle of interest connected to the CACC system through the V2V communication is selected as the target vehicle,
  wherein the CACC system operates in the follow mode that controls the driving speed of the subject vehicle based on information sensed by the sensor and the information received from the potential vehicles of interest, when a second potential vehicle of interest not connected to the CACC system through the V2V communication is selected as the target vehicle, and wherein the CACC system operates in the non-follow mode that controls the driving speed of the subject vehicle based on the information received from the potential vehicles of interest, when the potential vehicles of interest are not travel in the same lane or are not satisfied the distance condition and the speed condition.

12. The method according to claim 11, wherein selecting a target vehicle to be followed by the subject vehicle comprising:
- selecting vehicles that travel in the same lane as the subject vehicle as a first group of potential vehicles of interest;
- selecting, from the first group of potential vehicles of interest, vehicles that exist within a predetermined distance as a second group of potential vehicles of interest, wherein distance is measured by both the V2V communication and the sensor provided on the subject vehicle;
- selecting, from the second group of potential vehicles of interest, vehicles in which a difference between speed information received by the V2V communication and speed measured by the sensor is within a predetermined value as a third group of potential vehicles of interest; and
- selecting one vehicle in the third group of potential vehicles of interest as the first target vehicle to be followed by the subject vehicle.

* * * * *